United States Patent [19]
Wang

[11] Patent Number: 5,405,219
[45] Date of Patent: Apr. 11, 1995

[54] SOLIDS FEEDER

[75] Inventor: Duan-Fan Wang, Hillsborough, N.J.

[73] Assignee: Union Carbide Chemicals & Plastics Technology Corporation, Danbury, Conn.

[21] Appl. No.: 245,380

[22] Filed: May 18, 1994

[51] Int. Cl.$^6$ .......................... B65G 53/12; B01J 4/00
[52] U.S. Cl. .................................. 406/146; 406/137; 422/139; 422/145
[58] Field of Search ................ 422/139, 145, 140, 131, 422/135, 311; 239/143, 654, 424.5, 416.5, 416.4; 406/144, 146, 136, 137, 108, 122, 142, 143

[56] References Cited

U.S. PATENT DOCUMENTS

| | | | |
|---|---|---|---|
| 1,731,265 | 10/1929 | Quelch | 239/424.5 |
| 4,518,750 | 5/1985 | Govoni et al. | 422/143 X |
| 4,994,534 | 2/1991 | Rhee et al. | 526/88 |

*Primary Examiner*—Amalia L. Santiago
*Attorney, Agent, or Firm*—Saul R. Bresch

[57] ABSTRACT

An article of manufacture comprising (i) a double cone having apexes at opposite ends, said double cone having independent gas inlet means at about the apex of the first cone and multiple independent gas outlet means in the second cone, and (ii) a hollow tube, open at both ends, inside the double cone running from one apex to the other apex having independent gas inlet means at the apex of the first cone and independent gas outlet means at the apex of the second cone.

4 Claims, 1 Drawing Sheet

SOLIDS FEEDER

TECHNICAL FIELD

This invention relates to a piece of apparatus, which can be used to feed solids such as fluidization aids, prepolymerized catalyst precursors, and the like into polymerization reactors, holding bins, or other solids receiving receptacles.

BACKGROUND INFORMATION

U.S. Pat. No. 4,994,534 ('534) and U.S. Pat. application Ser. No. 08/029,821 are concerned with the introduction of fluidization aids into a polymerization reactor to avoid the agglomeration of sticky polymers. In the drawing of '534, the fluidization aid, referred to as inert particulate material, which can be, for example, carbon black, silica, or clay, is introduced into the polymerization reactor through a feeder vessel into transport lines in which the solids are carried along into the reactor by an inert gas.

Typically, the feeder vessel is operated under high pressure, and the transport lines and the reactor are operated under a relatively lower pressure. The inert particulate material is loaded into the high pressure vessel at atmospheric pressure. Then, the vessel is pressurized, usually with an inert gas such as nitrogen. When the discharge valve of the high pressure vessel is opened, the inert particulate material is forced out of the high pressure vessel through conduits or supply lines to a receiving vessel, which can be a polymerization reactor, all operated at a lower pressure. Such a procedure has its limitations when dealing with an inert particulate material, which is in the form of a cohesive fine powder, e.g., powders having an average particle size of about 150 or less microns. Examples of cohesive fine powders are soft carbon beads having the aforementioned particle size.

Generally, cohesive fine powders have very poor permeability and, thus, are easily packed. If the high pressure gas is injected directly into the bed of cohesive fine powder in the high pressure vessel, the force of the high pressure gas causes the powder to form a "bridge" inside the high pressure vessel and then pack. Once the bridge is formed, the feeding process from the high pressure vessel to the reactor fails.

To prevent the cohesive fine powder from being packed inside the high pressure vessel, the gas is permitted to expand and reduce its pressure before it contacts and compresses the bed of cohesive fine powder. In this way, the force of the gas is spread evenly across the bed, and the formation of a bridge with consequent packing is reduced, but still a problem.

One solution to this problem was to provide a hollow aeration cone inside of the high pressure vessel. This aeration cone evolved into a double cone, and was eventually improved by adding perforations to the lower end of the bottom cone, i.e., close to the apex of the inverted cone. However, even with this improved device, the combination of high pressure and the cohesive fine powder served to plug up the discharge valve of the high pressure (above about 50 psia) vessel. The blocked discharge valve, in turn, caused a bridge to be formed and the cohesive fine powder to pack thus nullifying the effect of the perforated double aeration cone.

DISCLOSURE OF THE INVENTION

An object of this invention, therefore, is to provide an article of manufacture, which, when inserted inside the discharge end of a vessel adapted to feed cohesive fine powder by means of a gas under high pressure, will essentially eliminate bridging and packing and essentially avoid plugging of the discharge valve. Other objects and advantages will become apparent hereinafter.

According to the present invention, the above object is met by an article of manufacture comprising (i) a double cone having apexes at opposite ends, said double cone having independent gas inlet means at about the apex of the first cone and multiple independent gas outlet means in the second cone, and (ii) a hollow tube, open at both ends, inside the double cone running from one apex to the other apex having independent gas inlet means at the apex of the first cone and independent gas outlet means at the apex of the second cone.

Two other embodiments of the invention are as follows:

II. In a feeder vessel having gas and powder inlet means and a cone shaped lower portion having gas/powder outlet means at its apex, the improvement comprising an article of manufacture located in the feeder vessel just prior to the powder outlet means, said article of manufacture comprising (i) a double cone having apexes at opposite ends, said double cone having independent gas inlet means at about the apex of the first cone and perforations located in the half of the second cone closest to its apex, and (ii) a hollow tube, open at both ends, inside the double cone running from one apex to the other apex having independent gas inlet means at the apex of the first cone and independent gas outlet means at the apex of the second cone, the gas outlet means being directed towards the gas/powder outlet means of the feeder vessel.

III. A process for feeding a fine powder from a feeder vessel to a receiving vessel wherein the feeder vessel has independent gas and powder inlet means and a cone shaped lower portion having the article of manufacture, mentioned above, located therein and gas/powder outlet means at its apex, the gas outlet means of the hollow tube being directed towards the gas/powder outlet means, which is connected to gas/powder inlet means of the receiving vessel, said process comprising:

(a) introducing the fine powder into the feeder vessel through the powder inlet means in sufficient amount to form a powder bed;

(b) introducing gas under high pressure through the gas inlet means against the powder bed;

(c) introducing gas under high pressure into the gas inlets of the article of manufacture defined in claim 1; and (d) opening the gas/powder outlet means of the feeder vessel and the gas/powder inlet means of the receiving vessel.

DESCRIPTION OF THE PREFERRED EMBODIMENT(S)

Figure 1:
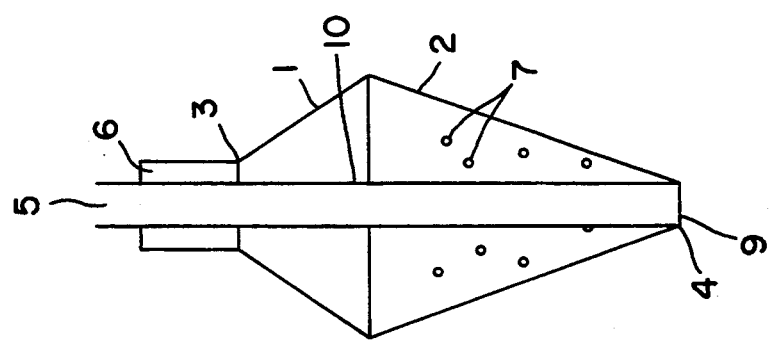
FIG. 1 is a schematic diagram of a cross-section of one embodiment of the invention.

Referring to FIG. 1 of the drawing:

The drawing schematically describes an embodiment of the invention in terms of an aeration double cone with a centered jet tube. The upper cone is first cone 1. Apex 3 is at the top of cone 1, and the cone expands or tapers out to meet the expanded portion of the lower cone, referred to as second cone 2. First cone 1 has an independent gas inlet 6, i.e., gas inlet 6 is independent from gas inlet 5, the gas inlet for jet tube 10.

Jet tube 10 is preferably centered following the central axis of the two cones, which runs from apex 3 to apex 4. It is a solid hollow tube, open at both ends. At the upper end, i.e., at apex 3, it is connected to gas inlet 5, which, as noted, is independent from the gas inlet 6 for the double cone. At the lower end, i.e., at apex 4, jet tube 10 is connected to gas outlet 9, which is independent from the gas outlet for the double cone, i.e., perforations 7.

Second cone 2 is inverted with respect to first cone 1, the expanded portion of second cone 2 meeting the expanded portion of first cone 1. Second cone 2 contains multiple gas outlet means represented by perforations 7. Perforations 7 are preferably located in the lower half of cone 2, i.e., the half closest to apex 4.

It will be noted that both of the cones are truncated at their apexes. Apex 3 and apex 4, therefore, represent the truncated end of their respective cones rather than the pointed end. The number of perforations is proportional to the surface area of cone 2, i.e., the greater the surface area, the greater the number of perforations. A typical number of perforations can be in the range of about 1 to about 5 holes per square inch. The double cone can be manufactured in one piece or the two cones can be welded together. Generally, first cone 1 is shorter than second cone 2. In terms of length measured along the central axis from apex 3 to apex 4, the ratio of the length of second cone 2 to first cone 1 can be about 6.5:1 to about 1:1.

Figure 2:
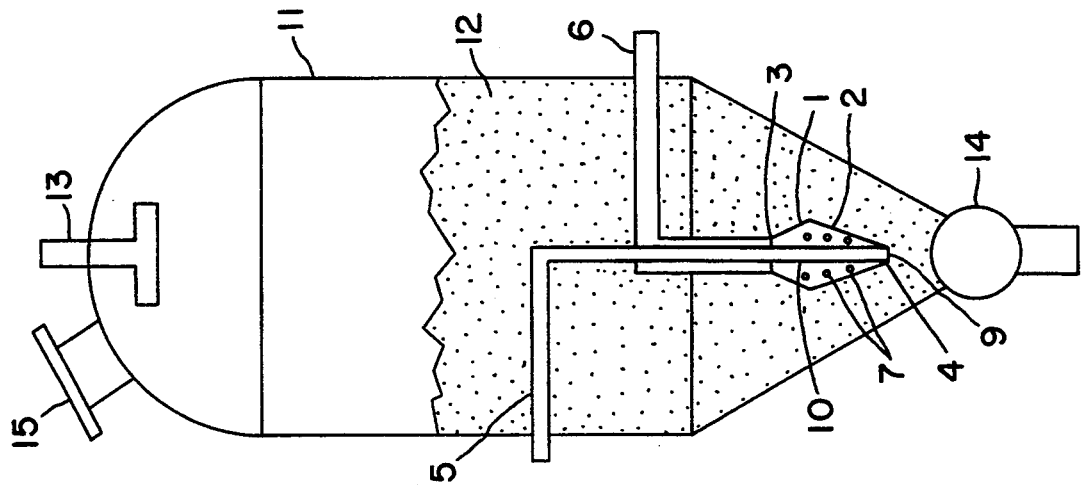
FIG. 2 is a schematic diagram of a cross-section of a high pressure feeder vessel containing an embodiment of the invention similar to that described in FIG. 1.

Referring to FIG. 2:

FIG. 2 schematically describes another embodiment of the invention in terms of a cross-section of a high pressure feeder vessel containing an embodiment of the invention similar to that described in FIG. 1. Vessel 31 of '534, mentioned above, is an example of a feeder vessel.

Feeder vessel 11 is shown in the drawing as containing cohesive fine powder 12, which is to be fed into a polymerization reactor, a storage bin, or other receptacle (not shown). The powder is introduced into feeder vessel 11 through powder inlet 15, generally at atmospheric pressure. Initially, powder 12 can be introduced at a higher level than shown in the drawing.

An additional feature of this invention concerns the use of a high pressure gas at the top of the bed. When it is desired to feed powder 12 into a receiving vessel, an inert gas such as nitrogen is introduced into feeder vessel 11 under high pressure, e.g., a pressure in the range of about 20 psia to about 600 psia. This, of course, pressurizes feeder vessel 11. Sufficient room is left at the top of feeder vessel 11 for the high pressure gas to expand. This is satisfactorily accomplished by using a T shaped feeder gas inlet 13, as shown. Thus, the pressure is reduced somewhat before the gas contacts powder 12, and the force of the gas is spread evenly across the powder bed instead of permitting the gas to be directed to one spot in the bed. This procedure avoids compressing the powder bed on initiation of the feeding process. The receiving vessel is maintained at a lower pressure than high pressure feeder vessel 11. The high pressure gas forces powder 12 through feeder vessel 11 towards discharge valve 14. Discharge valve 14 is opened, preferably after feeder vessel 11 is pressurized to the desired pressure, and powder 12 passes through valve 14 into the receiving vessel. It will be understood that discharge valve 14 functions as both a powder outlet and gas outlet for feeder vessel 11. This outlet for both gas and powder is referred to as the "gas/powder outlet". Typically, it is connected to a "gas/powder inlet" of a receiving vessel.

In order to essentially avoid bridging, packing, and plugging at the discharge end of feeder vessel 11 and at discharge valve 14, just prior to, or simultaneously with, the opening of discharge valve 14, high pressure gas is injected into the double cone through gas inlets 5 and 6. The high pressure gas introduced through gas inlet 6 passes through first cone 1 to second cone 2 and exits the double cone through perforations 7. The high pressure gas introduced through gas inlet 5 passes through jet tube 10 and exits at gas outlet 9. The combination thrust of the high pressure gases from feeder gas inlet 13 and gas inlets 5 and 6 serves to drive cohesive fine powder 12 through discharge valve 14 into a receiving vessel essentially without, bridging, packing and plugging.

Typically, the upper portion of feeder vessel 11 is cylindrically shaped and the lower portion of feeder vessel 11 is cone shaped as shown in the drawing and in vessel 31 of '534. The cone shaped lower portion is preferred in that it provides an efficient feeding system.

Feeder vessel 11 is generally operated in intermittent discharge cycles. Each discharge cycle preferably is carried out according to the following pattern:

(i) inject high pressure gas into feeder gas inlet 13;
(ii) inject high pressure gas into gas inlets 5 and 6 prior to or simultaneously with step (iii);
(iii) open discharge valve 14;
(iv) after about 1 to about 10 seconds, shut off the gas to gas inlets 5 and 6 (or maintain a minimal amount of gas to gas inlet 6, preferably at a flow rate of about 5 to 20 pounds per hour);
(v) when the desired amount of powder 12 is discharged, simultaneously shut off the gas to all inlets and shut discharge valve 14.

Except for the double cone with jet tube as illustrated in FIG. 1 and described above, the other apparatus and materials with which this invention is involved are conventional, e.g., the feeder vessel, the receiving vessel, the cohesive fine powder, the gas inlet piping, the pressurized gas sources, the inert gas, a powder inlet device and a powder discharge valve, and valves used to control the flow of gas. All of the equipment can be made from stainless steel or carbon steel.

Generally, the relative size of the feeder vessel to the double cone with jet tube can be observed in FIG. 2. The relative size of the feeder vessel to the double cone is related to the flow property of the fine powder. Thus, the particular size of the feeder vessel and the double cone will be determined by those knowledgeable in the art based on the solids desired to be fed by the system.

Typical dimensions (approximate) of a feeder vessel and the double cone with jet tube, which would be used therein are as follows:

(1) feeder vessel: length measured along central axis running from the feeder gas inlet to the discharge valve is 6.5 feet; length measured along central axis running from the feeder gas inlet to the beginning of the cone shaped portion is 4 feet; and maximum diameter of the cylindrical portion is 2 feet.

(2) double cone with jet tube: length measured along central axis running from apex to apex is 10 inches; length measured along central axis running from the apex of the first cone to the end of the first cone is 4 inches; length measured along central axis running from the apex of the second cone to the end of the second cone is 6 inches; diameter at meeting of first and second cones is $2\frac{7}{8}$ inches; diameter of jet tube is $\frac{3}{8}$ inch; diameter at apex 3 is 1 inch; diameter at apex 4 is $\frac{3}{8}$ inch; and number of perforations is 10.

The patent and patent application mentioned in this specification are incorporated by reference herein.

I claim:

1. In a feeder vessel having gas and powder inlet means and a cone shaped lower portion having gas and powder outlet means at its apex, the improvement comprising an article of manufacture located inside the feeder vessel above the powder outlet means, said article of manufacture comprising (i) a double cone having apexes at opposite ends, said double cone having gas inlet means at about the apex of the first cone and perforations located in the half of the second cone closest to its apex, and (ii) a hollow tube, open at both ends, inside the double cone running from one apex to the other apex having gas inlet means at the apex of the first cone and gas outlet means at the apex of the second cone, the gas outlet means being directed towards the gas and powder outlet means of the feeder vessel.

2. The feeder vessel defined in claim 1 wherein the perforations are located in the half of the second cone closest to its apex.

3. The feeder vessel defined in claim 1 wherein the ratio of the length of the second cone to the length of the first cone, as measured along a central axis of the double cone running from apex to apex, is in the range of about 6.5:1 to about 1.0:1.

4. The feeder vessel defined in claim 1 wherein the hollow tube surrounds a central axis of the double cone running from apex to apex.

* * * * *